United States Patent [19]

Lamisse

[11] 4,303,441

[45] Dec. 1, 1981

[54] METAL RECOVERY PROCESS

[75] Inventor: Michel G. Lamisse, Champigny-sur-Marne, France

[73] Assignee: Eastman Kodak Company, Rochester, N.Y.

[21] Appl. No.: 198,573

[22] Filed: Oct. 20, 1980

[30] Foreign Application Priority Data

Oct. 23, 1979 [FR] France ............................. 79 26214

[51] Int. Cl.³ .......................................... C22B 11/04
[52] U.S. Cl. ................................. 75/109; 75/118 R; 75/118 P
[58] Field of Search .................. 75/108, 109, 118 R, 75/118 P; 96/60 BF; 430/30, 400; 423/43, 34; 204/109

[56] References Cited

U.S. PATENT DOCUMENTS

| | | | |
|---|---|---|---|
| 2,194,056 | 3/1940 | Quaglia | 75/109 |
| 2,214,765 | 9/1940 | Holzwarth | 75/109 |
| 3,490,899 | 1/1970 | Krivsky et al. | 75/109 |
| 3,616,412 | 10/1971 | Guage | 204/195 R |
| 3,705,716 | 12/1972 | Hendrickson | 75/118 P X |
| 4,008,077 | 2/1977 | Wallace | 75/118 P |
| 4,065,313 | 12/1977 | Shippey | 430/30 |
| 4,211,630 | 7/1980 | Blake et al. | 430/400 X |

*Primary Examiner*—G. Ozaki
*Attorney, Agent, or Firm*—D. F. Janci

[57] ABSTRACT

A method for recovering a metal from a solution containing ions of the metal and a complexing agent for the ions is disclosed. The method involves contacting the solution with another metal more electropositive than the metal to be recovered in order to bring about a metal-metal exchange reaction which will yield a precipitate of the metal to be recovered. The precipitate is then separated from the solution. In order to maximize the yield of the metal-metal exchange reaction, the redox potential of the solution is measured during the course of the reaction, and the precipitate is separated from the solution as soon as the redox potential substantially reaches a predetermined minimum value.

12 Claims, 3 Drawing Figures

METAL RECOVERY PROCESS

BACKGROUND OF THE INVENTION

1. Field of the Invention

This invention relates to the recovery of a metal from a solution containing ions of the metal and a complexing agent for the ions by means of a metal-metal exchange reaction that yields a precipitate of the recoverable metal, which can then be separated from the solution. In one embodiment the invention relates to the recovery of silver from solutions that have been used to process silver halide photographic materials, e.g., spent fixing or bleach-fix solutions. More particularly, this invention is concerned with maximizing the yield of metal-metal exchange reactions useful for metal recovery.

2. Description Relative to the Prior Art

The major known methods for recovering metals from solutions containing ions of the metals are precipitation by chemical agents, electrolysis, and metal-metal exchange. The last-mentioned method comprises reducing a dissolved complex of ions of the metal to be recovered by contact with a more reducing metal, i.e., a metal which is more electropositive than the metal to be recovered. (A metal which is more reducing or more electropositive than another metal is a metal which is more easily oxidized than the other metal and, thus, is an effective reducing agent for cations of the other metal). The precipitate of the recoverable metal is then separated from the solution by known methods, such as filtration.

Many patents describe methods and apparatus for recovering metals by metal-metal exchange. For example, U.S. Pat. Nos. 1,194,056; 3,705,716; and 4,065,313 disclose methods and apparatus for recovering silver from used photographic processing solutions by an exchange reaction with a metal more electropositive than silver, such as iron or copper. These patents are hereby incorporated herein by reference.

One problem associated with the metal-metal exchange recovery method is that the yield obtained can be adversely affected by the presence in the solution of chemical species that would tend to reoxidize the recoverable metal already reduced by the metal-metal exchange reaction. In other words, when the purpose is to recover a metal from an ionic solution by a metal-metal exchange reaction, it is desirable that the reduced recoverable metal not be reoxidized by reaction with other chemical species. Maximum yields will not be obtained if such reoxidation reactions are allowed to proceed to a significant extent.

For example, as described in the above-identified patents, the exchange reaction with elemental iron to precipitate silver from used photographic processing solutions may be expressed as:

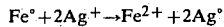

$$Fe° + 2Ag^+ \rightarrow Fe^{2+} + 2Ag°$$

If the ferrous ions formed as a result of this exchange reaction are oxidized by air to form ferric ions in the used processing solution, these ferric ions are capable of reoxidizing the reduced silver back to silver ions; and the tendency to do this is even more pronounced when the processing solution contains complexing agents for silver ions (such as the thiosulfate compounds typically found in photographic fixing baths). The same problem can arise when the processing solution from which silver is to be recovered is a bleach-fix solution that already contains ferric ions from the ferric ethylenediaminetetraacetic acid complexing agents frequently found in such solutions.

Some prior art processes attempt to avoid this problem by treating used processing solutions by a continuous (rather than batch) method wherein the solution flows path the reducing metal (e.g. steel wool) with silver reduction occurring at the reducing metal and the continuous flow of solution carrying away substances such as ferric ions which could otherwise reoxidize the reduced silver. For example, the methods disclosed in U.S. Pat. Nos. 2,194,056; 3,705,716; and 4,065,313 are of this type. These prior art methods, however, have their own disadvantages. For example, it is difficult to determine the precise moment at which the reducing metal is about to become exhausted and should be replaced with a new supply of reducing metal. The method described in U.S. Pat. No. 2,194,056 does not even attempt to do this; rather, according to that method the recovery cartridge is weighed and replaced when only 60 to 75 percent of the reducing metal has been exhausted, thus necessitating frequent cartridge replacement and considerable waste of reducing metal.

U.S. Pat. Nos. 3,705,716 and 4,065,313 determine when the reducing iron is exhausted by measuring either the silver ion concentration in the effluent from the cartridge (U.S. Pat. No. 3,705,716) or the change in the ratio of ferric to ferrous ions at the entrance and exit of the cartridge (U.S. Pat. No. 4,065,313). Unfortunately, by the time either of these methods has determined that the iron is exhausted, some processing solution containing significant concentration of silver ions has already left the cartridge, and the processing solution remaining in the cartridge at this point not only contains significant silver ion concentration, but may also have begun to reoxidize silver previously reduced by the metal-metal exchange reaction. Thus, these prior art methods can produce yields or recovered silver that are significantly less than the maximum possible.

SUMMARY OF THE INVENTION

The present invention provides a method for metal recovery by metal-metal exchange that avoids the disadvantages of both the prior art batch methods and prior art continuous methods. It has been found that if sufficient iron powder is introduced with stirring in a used photographic fixing or bleach-fix solution, the redox potential of the solution decreases, reaches a minimum value, then increases. The minimum value occurs at the time when the solution contains a minimum concentration of silver ions. The potential begins to increase again at the point where the concentration of silver ions also begins to increase, indicating that some of the reduced and precipitated silver is being reoxidized to silver ions. The best time to stop the reaction and filter out the precipitated silver in order to obtain the maximum possible yield is when the redox potential of the solution substantially reaches its minimum value, i.e., when the concentration of silver ions is at a minimum (rather than after the silver ion concentration has begun to increase again, which is the point at which the prior art methods discussed above choose to begin separating precipitated silver).

Therefore, in a method for recovering a first metal from an aqueous solution containing ions of the first metal and a complexing agent for the ions, the method comprising contacting the solution with a second metal more electropositive than the first metal to thereby provide a metal-metal exchange reaction to form a precipitate of the first metal, and separating the precipitate from the solution; the present invention provides the improvement comprising measuring the redox potential of the solution during the course of the exchange reaction and initiating the separation of the precipitate from the solution when the redox potential is substantially at a predetermined minimum value.

In one embodiment of the invention the stopping of the reaction is carried out by generating a signal when the measured redox potential is substantially at the predetermined minimum value and separating the precipitate from the solution in response to that signal.

BRIEF DESCRIPTION OF THE DRAWINGS

In the detailed description of the preferred embodiments of the invention presented below, reference is made to the accompanying drawings, in which.

DETAILED DESCRIPTION OF PREFERRED EMBODIMENTS

Figure 1:
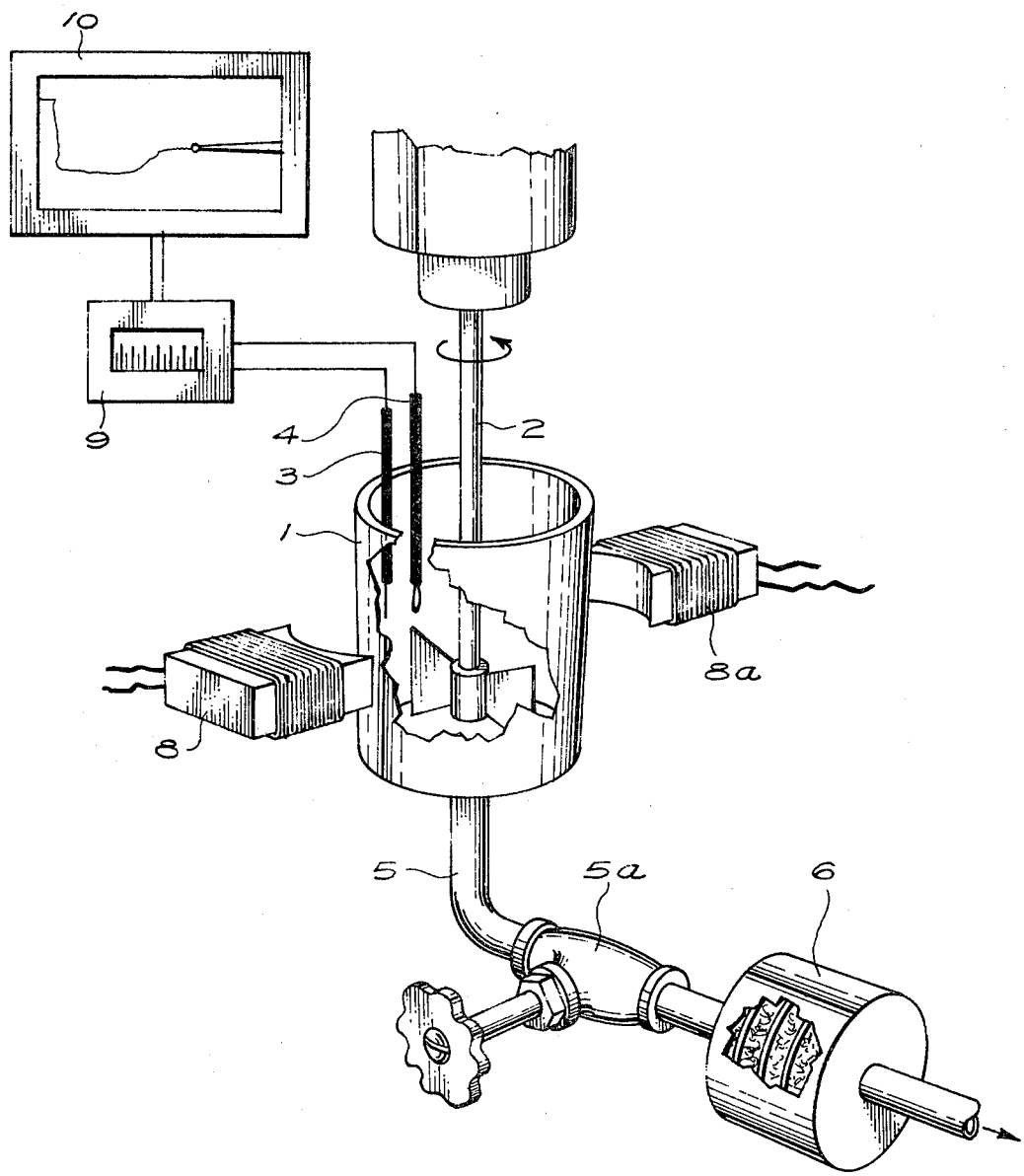
FIG. 1 is a schematic view of apparatus useful for practicing the method of the invention.

In a preferred embodiment of the present invention the method of the invention is used to recover silver from a solution containing silver ions and a complexing agent for silver ions, e.g., a solution that has been used to process silver halide photographic materials, such as a spent fixing or bleach-fixing solution that contains, besides various other reagents used in photographic processing, silver ions and a complexing agent for silver ions, such as an ammonium or alkali metal thiosulfate or thiocyanate.

The initial silver concentration in the solution has no effect on the percentage yield of recovered silver obtainable in accordance with the invention, and it is thus possible, for example, to treat in substantially the same manner and with the same percentage yield fixers which have been used for processing conventional films for black and white photography, x-ray materials, or graphic arts materials. Likewise, except for complexing agents or oxidizing agents for silver ions or silver, other chemicals typically present in the spent fixer do not in general, substantially affect the course of the recovery method.

A variety of reducing metals are useful in practicing the method of the invention. Any reducing metal can be employed, so long as it is capable of displacing ions of the metal to be recovered from solution. In choosing an optimum metal for the method of the invention, one should also take into account the speed of the metal-metal exchange reaction that a given reducing metal will effect. That is, some reducing metals may act too slowly to permit the invention to be practiced to commercial advantage. Furthermore, the cost of the reducing metal and its availability in a physical form appropriate for practically carrying out a metal-metal exchange reaction should also be considered.

Generally, one skilled in the art can select the most advantageous reducing metals in accordance with the factors described above without undue experimentation. For example, metals such as iron, aluminum, copper, magnesium, and zinc are capable of reducing silver ions with sufficient speed, and metals such as zinc, aluminum, and magnesium are capable of reducing ions of copper or tin with sufficient speed. Such metals are also readily available in forms appropriate for the exchange reaction, such as in the form of discrete particles (e.g., a powder) or in the form of a wool or plate.

Iron is a particularly advantageous reducing metal for recovering silver in accordance with the method of the invention, in view of its low cost and its availability in powder forms having a wide variety of particle sizes. Satisfactory results are obtained with iron powders in which the individual particles have an average diameter of up to about 1000 microns, preferably in the range of about 10 to about 100 microns. Generally, reactivity increases as the size of reagent particles decreases, but when the particles are extremely small, difficulties can arise in the separation operation carried out at the end of the exchange reaction. Also, the fact that iron is magnetic, while certain metals such as silver are non-magnetic, enables the use of a separation technique at the end of the exchange reaction in which an external magnetic field (generated by permanent magnets or electromagnets) is applied to the treated solution during the separation step to enhance separation.

In the practice of the method of this invention, the minimum value of redox potential in the particular solution that is capable of being reached during the metal-metal exchange reaction is determined. This minimum value depends upon a number of factors, including: the concentration of complexing agents for ions of the recoverable metal and oxidizing agents for the recoverable metal in the solution; the tendency of the particular reducing metal to reduce ions of the metal to be recovered; the amount of reducing metal provided in the process; and the physical form of the reducing metal to be used (e.g., the particle size of the reducing metal when in the form of a powder). As illustrated by the following Example 1, this minimum potential can be conveniently determined by one of ordinary skill in the art by contacting a sample of the solution to be treated with a portion of the reducing metal to be used, and in the same proportions as intended to be used, in the actual practice of the method of the invention. The metal-metal exchange reaction between the solution sample and portion of reducing metal is then allowed to proceed, while, concurrently, the redox potential of the solution is measured by means of a pair of appropriate electrodes immersed in the solution sample and attached to a voltmeter. As the reaction proceeds, the redox potential (in volts or millivolts) of the solution will be observed decreasing, reaching some minimum value, and then increasing again. The minimum value observed (which occurs when the concentration of ions of the metal to be recovered in the solution is at a minimum) then becomes the predetermined minimum value to be used to decide when to stop the reaction by initiating the separating step in the actual practice of the method of the invention.

In the actual practice of the method, the optimum amount of reducing metal to be used to achieve the lowest possible minimum redox potential (and, thus, maximum yield of recoverable metal) is generally determined from the stoichiometry of the metal-metal exchange reaction. For example, when the exchange reaction involved is $Fe° + 2Ag^+ \rightarrow Fe^{2+} + 2Ag°$, an amount of iron from about 1 to about 10 times, often about 4 to about 10 times the stoichiometric amount of silver to be recovered will generally lead to very satisfactory results. In this specific reaction, an amount of iron from about 1 to about 10 times the stoichiometric amount of silver to be recovered corresponds to an amount by weight of iron from about 0.26 to about 2.6 times the amount, by weight, of silver ions in the solution.

In some cases (e.g., in which the solution already contains large amounts of complexing agents for ions of the recoverable metal and/or oxidizing agents for the recoverable metal) it may be advantageous to increase the amount of reducing metal beyond 10 times the stoichiometry of the exchange reaction in order to assure that the maximum possible yield is achievable. In this respect the method of the invention is particularly advantageous for the recovery of silver from photographic bleach-fix solutions that contain oxidizing agents, such as ferricyanides or ferric salts, and complexing agents such as ethylenediaminetetraacetic acid (EDTA), which make it difficult to maximize the yield of silver recovery. By carrying out the operation with a large excess of reducing metal and using the method of the invention to determine the precise moment at which to separate out the silver in order to maximize the yield of recovered silver, one obtains yields as good as those obtained from used fixers (e.g., yields of more than 96%).

Certain formulations of bleaching baths contain alkali metal phosphates, such as described in "Chimie et Physique Photographiques" by P. Glafkides, p. 737, 4th Ed., Paris 1976. Especially if iron is used as the reducing metal, such phosphates can interfere with the desired metal-metal exchange reaction. The phosphate-containing solution is, therefore, first treated by a calcium salt solution to precipitate calcium phosphate, which can then be filtered out. The bath can then be successfully treated by the method of the invention. Salts other than calcium are, alternatively, used to precipitate the phosphate, if desired.

FIG. 1 is a schematic view of apparatus useful for practicing the method of the invention. The apparatus comprises a vessel 1 with a rotary stirrer 2 positioned therein. Vessel 1 opens into pipe 5 which contains valve 5a. When opened, valve 5a allows vessel 1 to discharge any solution it contains toward a separating device, such as filter press 6. Alternatively, another equivalent filtering device is used instead of filter press 6. Most efficient operation occurs when the opening into pipe 5 is located at the lower part of vessel 1, preferably at the bottom of vessel 1. Two electrodes 3 and 4 are positioned within vessel 1 so as to be immersed in any solution contained therein. One of the electrodes is a reference electrode, e.g., a saturated calomel electrode. The other electrode is a measurement electrode of a type appropriate for the particular metal-metal exchange reaction to be carried out in vessel 1. For example, a platinum electrode can be used for the reduction of silver ions by iron. Electrodes 3 and 4 are connected to a millivoltmeter 9 in order to make continuous measurements of the redox potential of solution in vessel 1 during the practice of the inventive method. Optionally, millivoltmeter 9 is connected to a recording device 10 capable of plotting measured redox potential as a function of time. Electromagnets 8 and 8a are connected to a power source (not shown) and disposed outside of vessel 1. These electromagnets are optional, but if the reducing metal used in the process is magnetic and the recoverable metal is nonmagnetic, these magnets are activated in order to aid in separating out excess reducing metal when the solution redox potential reaches its predetermined minimum value and the separating step is begun.

In the practice of the invention, solution to be treated and an appropriate amount of reducing metal are placed in vessel 1 and stirred while measuring the solution redox potential (discrete individual measurements can be used, if they are made frequently enough to provide reasonable assurance of detecting the point in time at which the solution redox potential substantially reaches the predetermined minimum value, but it is preferable to monitor the changing potential continuously throughout the course of the exchange reaction). When the measured potential is substantially at the predetermined minimum value, electromagnets 8 and 8a are activated and valve 5a is opened to cause the precipitated recoverable metal to be filtered out of the solution as the solution passes through filter press 6.

If desired, the stopping of the process is adaptable to being automated by providing means for generating a signal when the measured redox potential is substantially at the predetermined minimum value (e.g., by means of a simple voltage comparator circuit well known in the electrical art). If desired, the generated signal can then activate the electromagnets and open valve 5a (in this case an electrically operated valve) to stop the reaction and carry out the separating step automatically.

The following examples further illustrate the invention.

EXAMPLE 1

Relationship of Redox Potential to Silver Concentration

Figure 2:
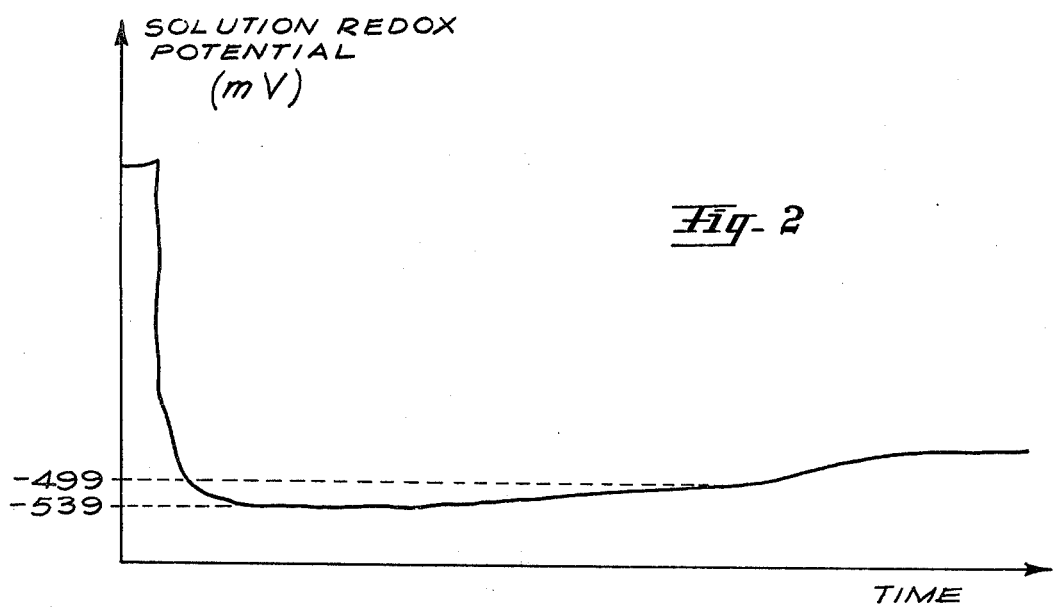
FIG. 2 is a graph illustrating solution redox potential versus time during the process of reducing silver ions with iron in a used photographic fixing solution as described in Example 1 below.

A platinum electrode and a saturated calomel electrode were immersed in a beaker containing one liter of a fixer having 6.1 gm of silver ions dissolved therein from the processing of medical x-ray films. The electrodes were connected to a conventional millivoltmeter which was itself connected to a conventional recorder. 4.883 gm of iron powder, having an average particle diameter of about 50 microns, was added to the solution with stirring. As shown in the FIG. 2 plot of solution redox potential versus time, the potential of the solution decreased, reached a minimum value ($-539$ mV), then increased again.

Figure 3:
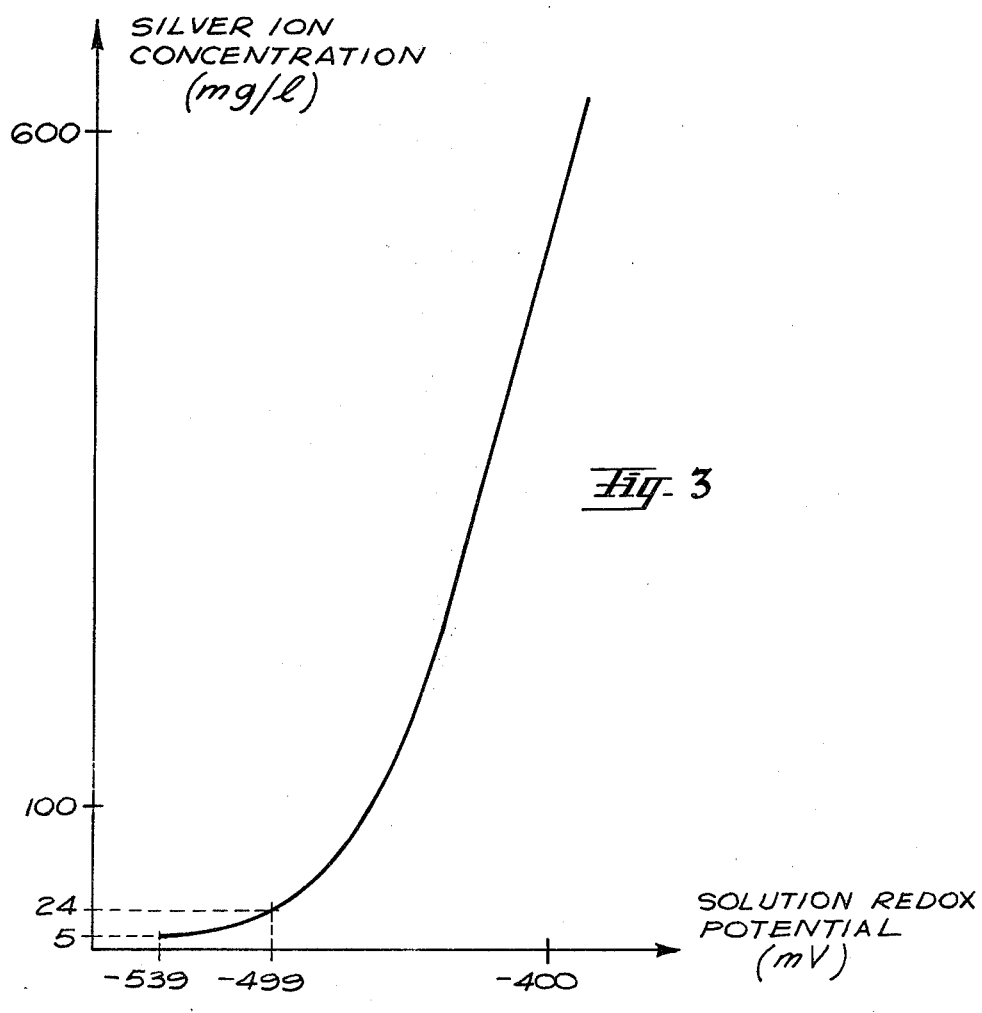
FIG. 3 is a graph illustrating silver ion concentration versus solution redox potential for the process described in Example 1 below.

Samples of the solution corresponding to various measured potentials were taken and the concentration of silver ions was measured by atomic absorption. As shown in the FIG. 3 plot of silver ion concentration versus solution redox potential, the minimum redox potential of $-539$ mV corresponded to a silver concentration of 5 mg/l, while at $-499$ mV, the silver concentration was 24 mg/l. This shows that the minimum solution redox potential occurred when silver ion concentration was at a minimum (i.e., when percentage yield of precipitated silver was at a maximum). However, when the process was not halted at this point by filtering out the silver precipitate, some of this precipitate was reoxidized and redissolved in solution, thus increasing both the silver ion concentration and the solution redox potential and reducing the yield of precipitated silver.

EXAMPLE 2

Influence of Amount of Iron Powder on Minimum Redox Potential Value

The procedure of Example 1 was repeated, except that the amount of iron powder added was varied. In each case the concentration of silver ions in solution was measured when the redox potential reached its minimum value. The results are summarized in the following Table I.

TABLE I

| Amount of Iron Added (grams) | Minimum Redox Potential Value (mV) | Silver Ion Concentration (mg/l) | % Yield of Silver Precipitate |
|---|---|---|---|
| 1.677 | −380 | 830 | 86.39 |
| 2.516 | −464 | 40 | 99.35 |
| 5.031 | −539 | 5 | 99.92 |
| 6.708 | −563 | 0.60 | 99.99 |
| 7.547 | −575 | 0.55 | 99.99 |
| 8.385 | −585 | 0.40 | 99.99 |

This shows that as the amount is increased, the minimum redox potential attainable decreases and the maximum percentage yield of silver increases until the amount of iron is at an optimum. It is, therefore, possible to select the amount of iron necessary to obtain a predetermined yield.

EXAMPLE 3

Influence of Iron Particle Size on Minimum Redox Potential

Example 1 was repeated, except that in this case the iron powder had an average particle diameter of about 800 microns, as opposed to the 50 micron average diameter particles used in Example 1. With the larger particles the minimum redox potential was less negative (−421 mV) and required more treatment time to reach than in Example 1. The maximum silver yield was correspondingly lower. It was found that the larger iron particles became coated with silver, whereupon an optimum exchange reaction between the dissolved silver ions and the iron particles was no longer possible. This shows that, in general, smaller iron particles increase the efficiency and extent of the exchange reaction.

EXAMPLE 4

Treatment of Fixer Contaminated with Bleach

The processing of color photographic materials sometimes requires bleaching of the metallic silver formed in the material upon development; this bleaching is then followed by fixing. Some of the bleaching solution (frequently comprising potassium ferricyanide) is generally carried along by the film into the fixing bath. Electrolytic methods of silver recovery from such contaminated solutions seldom produce yields above 60 percent.

Such a contaminated fixer solution, containing 1.44 gm/l of silver ions, was treated by the method of the invention. 75 liters of the solution and 270 grams of the iron powder used in Example 1 were placed in a plastic tank and stirred with a plastic-coated stirrer for 76 minutes, i.e., until a minimum solution redox potential of −543 mV was attained. The silver precipitate was then separated by filtration. The concentration of silver ions remaining in solution was only 1.3 mg/l at the time minimum potential was reached and after filtration. The yield of recovered silver was 99.9 percent. This shows that the method of the invention produces excellent yields when treating solutions containing components of both bleaching and fixing baths.

EXAMPLE 5

Treatment of Solution having Large Concentration of Silver Ions

Different batches of spent photographic fixer contain variable amounts of silver ions complexed by thiosulfate. Generally, silver ion concentration in spent medical x-ray fixers is about 6 g/l, while in other spent fixers it is usually about 3 to 4 g/l. However, tests showed that the method of the invention can be successfully practiced with fixers to which other silver-containing solutions or suspensions were added so that the initial concentration of silver ions in the solution to be treated was 30 g/l or more.

For example, some discarded photographic emulsions were first submitted to an enzymatic attack in order to degrade the gelatin. A sludge having a high silver content was thus obtained. 250 grams of this sludge were treated with a spent fixer, whose silver ion concentration was thereby raised to 30 g/l. After treatment by the method of the invention only 0.8 mg/l of silver ions remained in solution.

This invention has been described in detail with particular reference to certain preferred embodiments thereof, but it will be understood that variations and modifications can be effected within the spirit and scope of the invention.

What is claimed is:

1. In a method for recovering a first metal from an aqueous solution containing ions of said first metal and a complexing agent for said ions, said method comprising:
   (a) contacting said solution with a second metal that is more electropositive than said first metal to thereby provide a metal-metal exchange reaction to form a precipitate of said first metal, and
   (b) separating said precipitate from said solution; the improvement comprising:
   (c) measuring the redox potential of said solution during the course of said exchange reaction, and
   (d) initiating the separation of said precipitate from said solution when said redox potential is substantially at a predetermined minimum value.

2. In a method for recovering a first metal from a solution containing ions of said first metal and a complexing agent for said ions, said method comprising:
   (a) contacting said solution with a second metal that is more electropositive than said first metal to thereby provide a metal-metal exchange reaction to form a precipitate of said first metal, and
   (b) separating said precipitate from said solution; the improvement comprising:
   (c) measuring the redox potential of said solution during the course of said exchange reaction,
   (d) generating a signal when said redox potential is substantially at a predetermined minimum value, and
   (e) initiating the separation of said precipitate from said solution in response to said signal.

3. The method of claims 1 or 2, wherein said second metal is magnetic metal, said first metal is a nonmagnetic metal and an external magnetic field is applied to said solution during said separating step.

4. The method of claims 1 or 2, wherein said first metal is silver.

5. The method of claim 4, wherein said second metal is zinc, magnesium, iron, aluminum, or copper.

6. The method of claims 1 or 2, wherein the redox potential of said solution is measured continuously during the course of said exchange reaction.

7. In a method for recovering silver from an aqueous solution containing silver ions and a complexing agent for silver ions, said method comprising:
(a) contacting said solution with iron to thereby provide a metal-metal exchange reaction to form a silver precipitate from said silver ions, and
(b) separating said silver precipitate from said solution;
the improvement comprising:
(c) measuring the redox potential of said solution during the course of said exchange reaction, and
(d) initiating the separation of said silver precipitate from said solution when said redox potential substantially equals a predetermined minimum value.

8. In a method for recovering silver fron an aqueous solution containing silver ions and a complexing agent for silver ions, said method comprising:
(a) contacting said solution with iron to thereby provide a metal-metal exchange reaction to form a silver precipitate from said silver ions, and
(b) separating said silver precipitate from said solution;
the improvement comprising:
(c) measuring the redox potential of said solution during the course of said exchange reaction,
(d) generating a signal when said redox potential is substantially at a predetermined minimum value, and
(e) initiating the separation of said silver precipitate from said solution in response to said signal.

9. The method of claims 7 or 8, wherein said iron is in the form of particles having an average diameter of from about 10 microns to about 100 microns.

10. The method of claims 7 or 8, wherein said iron is used in an amount which is from about 0.26 to about 2.6 times the amount, by weight, of said silver ions in said solution.

11. The method of claims 7 or 8, wherein said solution is a spent photographic fixing or bleach-fixing bath for silver halide photographic materials.

12. The method of claims 7 or 8, wherein the redox potential of said solution is measured continuously during the course of said exchange reaction.

* * * * *

UNITED STATES PATENT AND TRADEMARK OFFICE
CERTIFICATE OF CORRECTION

PATENT NO. : 4,303,441
DATED : December 1, 1981
INVENTOR(S) : Michel G. Lamisse

It is certified that error appears in the above—identified patent and that said Letters Patent is hereby corrected as shown below:

Column 1, line 34, change "1,194,056" to -- 2,194,056 --.

Signed and Sealed this

Tenth Day of August 1982

[SEAL]

Attest:

GERALD J. MOSSINGHOFF

Attesting Officer     Commissioner of Patents and Trademarks